United States Patent
Mildner

(10) Patent No.: US 8,931,814 B2
(45) Date of Patent: Jan. 13, 2015

(54) ARRANGEMENT HAVING A LOCK CROSSBEAM AND A HOOD LOCK FOR A MOTOR VEHICLE

(75) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 13/405,402

(22) Filed: Feb. 27, 2012

(65) Prior Publication Data

US 2012/0216583 A1 Aug. 30, 2012

(30) Foreign Application Priority Data

Feb. 26, 2011 (DE) .......................... 10 2011 012 529

(51) Int. Cl.
| | |
|---|---|
| *E05C 3/16* | (2006.01) |
| *B62D 25/08* | (2006.01) |
| *E05B 77/08* | (2014.01) |
| *E05B 83/24* | (2014.01) |

(52) U.S. Cl.
CPC .............. *B62D 25/082* (2013.01); *E05B 77/08* (2013.01); *E05B 83/24* (2013.01)
USPC ........................................... 292/216; 292/42

(58) Field of Classification Search
USPC ............................ 292/216, DIG. 42, DIG. 14
See application file for complete search history.

(56) References Cited

U.S. PATENT DOCUMENTS

| | | | | |
|---|---|---|---|---|
| 4,829,409 | A | * | 5/1989 | Funkey ......................... 362/496 |
| 8,109,560 | B2 | | 2/2012 | Joly-Pottuz |
| 2009/0315344 | A1 | | 12/2009 | Joly-pottuz |

FOREIGN PATENT DOCUMENTS

| | | |
|---|---|---|
| DE | 10109724 A1 | 11/2002 |
| DE | 102004014073 A1 | 10/2005 |
| DE | 602004002447 T2 | 10/2007 |
| DE | 202008000560 U1 | 3/2008 |
| DE | 102006046817 A1 | 4/2008 |
| DE | 102006047800 A1 | 4/2008 |
| DE | 102009056415 A1 | 6/2011 |
| EP | 1036730 A2 | 9/2000 |
| JP | 2008001210 A | 1/2008 |
| JP | 2009286148 A | 12/2009 |

OTHER PUBLICATIONS

German Patent Office, German Search Report for Application No. 102011012529.9, dated Oct. 25, 2011.
UK IPO, British Search Report for Application No. 1203210.8, dated Jun. 29, 2012.

* cited by examiner

*Primary Examiner* — Mark Williams
(74) *Attorney, Agent, or Firm* — Ingrassia Fisher & Lorenz, P.C.

(57) ABSTRACT

An arrangement for a vehicle body of a motor vehicle is provided. The arrangement includes a lock crossbeam having a front wall and a hood lock fastened on the front wall of the lock crossbeam and having a lock case. The front wall has a first depression in which the hood lock is at least partially accommodated. The first depression is stepped. The front wall has a front stop surface that is spaced apart from a rear stop surface. The lock case presses against the front stop surface and the rear stop surface while a middle part of the lock case is accommodated in the first depression.

15 Claims, 7 Drawing Sheets

ARRANGEMENT HAVING A LOCK CROSSBEAM AND A HOOD LOCK FOR A MOTOR VEHICLE

CROSS-REFERENCE TO RELATED APPLICATION

This application claims priority to German Patent Application No. 10 2011 012 529.9, filed Feb. 26, 2011, which is incorporated herein by reference in its entirety.

TECHNICAL FIELD

The technical field generally relates to an arrangement for a vehicle body of a motor vehicle, comprising a lock crossbeam and a hood lock having a lock case, the lock crossbeam having a front wall, the hood lock being fastened on the front wall of the lock crossbeam, and a first depression being implemented in the front wall, in which the hood lock is at least partially accommodated.

BACKGROUND

The legal regulations, which are continuously becoming stricter on $CO_2$ emission toward lower and lower emission values, are to be taken into consideration in the development of future vehicle generations. This is achievable, inter alia, by a more and more extensive weight reduction of the motor vehicles. Weight can be reduced, for example, in that the dimensions of a motor vehicle are reduced. In particular the front overhang of a motor vehicle can offer potential for a reduction of the weight.

The future vehicle generations must simultaneously meet the legal requirements for pedestrian protection. Against this background, the test and evaluation methods according to EURONCAP must particularly be met.

In particular, the front area of a motor vehicle, which can come into contact with the upper leg area of a pedestrian, must permit specific deformation paths. The deformation paths decrease the loads on the upper thighs of a pedestrian and thus reduce his risk of injury.

Lock crossbeams, on which the locks are fastened, are installed in the front area of the motor vehicle. The hood locks hold the engine hood closed or release it to fold open.

Two hood lock systems are currently used in automotive engineering. A first system has a hood lock having a locking pin. Upon closing of the engine hood, the locking pin plunges into a cylindrical part of a reinforcement plate welded onto the lock crossbeam. The locking pin is locked in a groove applied to the locking pin by a horizontally arranged locking spring. To open the engine hood, the locking spring is withdrawn from the groove via a Bowden cable. The engine hood is raised via a compression spring, which is arranged around the locking pin and above the lock crossbeam, and can be opened. However, in this first system, the locking spring and the reinforcement plate require a relatively large installation space in the vehicle longitudinal direction.

In a further system, a hood lock is engaged with a lock bow of the engine hood. Upon closing of the engine hood, a rotary latch is rotated over a defined pivot point by the lock bow and secured against unintentional opening by a spring-loaded part. The spring-loaded part is connected to a Bowden cable, which disengages the spring-loaded part from the rotary latch and releases the lock bow to open the engine hood. In this system, however, the hood lock used is installed by means of a "double L-shaped" lock case in front of the lock crossbeam. Valuable installation space in the vehicle longitudinal direction is occupied in this way.

There is therefore a demand for an arrangement made of a lock crossbeam and a hood lock, which displays the least possible extension in the vehicle longitudinal direction. On the one hand, this is to allow a deformation space to be provided in the area of the hood lock for pedestrian protection. On the other hand, this is to allow the dimensions of a motor vehicle, in particular its front overhang, to be reduced. In addition, other objects, desirable features and characteristics will become apparent from the subsequent summary and detailed description, and the appended claims, taken in conjunction with the accompanying drawings and this background.

SUMMARY

The various embodiments contemplated herein are based on an arrangement having a lock crossbeam and a hood lock for a vehicle body of a motor vehicle, which unfolds the least possible extension in the vehicle longitudinal direction and nonetheless ensures a sufficient pedestrian protection and sufficient twisting and torsional stiffness of the vehicle body. In an embodiment, such an arrangement for a vehicle body of a motor vehicle comprises a lock crossbeam and a hood lock having a lock case, the lock crossbeam having a front wall, the hood lock being fastened on the front wall of the lock crossbeam, and a first depression being implemented in the front wall, in which the hood lock is at least partially accommodated.

In an embodiment, the first depression is stepped, with a front stop surface being provided, which is spaced apart from a rear stop surface, and the lock case pressing against the front stop surface and the rear stop surface. A middle part of the lock case is accommodated in the first depression. A reduction of the front overhang is made possible by this measure, because the hood lock can largely be accommodated in the lock crossbeam. In particular, an unlocking device can be substantially accommodated inside the lock crossbeam. In this regard, the reduction of the front overhang provides room for deformation paths, which increase the pedestrian protection. Cost advantages over the arrangements of the prior art also are realized because compensation measures for achieving a pedestrian protection can be substantially omitted. Cost advantages also result from a reduction of the length of the motor vehicle, because the front overhang can be reduced. In particular a reduction of the vehicle weight is also made possible by the arrangement. Through the stepped depression of the lock crossbeam, a sufficient twisting and torsional stiffness of the vehicle body as a whole is also ensured. The arrangement contemplated herein is therefore preferably used in a vehicle body of a motor vehicle.

According to an embodiment, the first depression is implemented as a first indentation in the front wall. A metal lock crossbeam, which is preferably configured as a sheet-metal part, can be provided with a depression by an embossing or shaping technology. The lock crossbeam has the indentation in the middle. The indentation allows the lock case and an unlocking device of the hood lock to be arranged in the depth of the indentation.

The first depression has a support surface, which extends orthogonally to the front wall, for the middle part of the lock case, in another embodiment. The support surface stabilizes the contact of the lock case on the front stop surface or on the rear stop surface. Furthermore, the support surface stabilizes the lock crossbeam in regard to its twisting and torsional stiffness, because it implements a stepped geometry therein.

Two circular passage holes can be implemented in the front stop surface. In this way, it is possible to screw the lock case together with the lock crossbeam.

In an embodiment, two rectangular through holes are implemented in the rear stop surface inside the first depression. An unlocking device for the hood lock can be guided through the at least substantially rectangular through holes, on which a Bowden cable for unlocking the engine hood can be installed. A left rectangular through hole can be used for left-hand drive vehicles, and a right rectangular through hole can be used for right-hand drive vehicles.

Two further circular through holes can be implemented in the rear stop surface inside the first depression. It is possible in this way to screw the lock case together with the lock crossbeam.

In a further embodiment, the lock case has a front screw connection surface, which presses against the front stop surface, and a rear screw connection surface, which presses against the rear stop surface. The two screw connection surfaces are connected to one another by a horizontal surface. A stepped shape is thus provided to the lock case, which is implemented as complementary to the stepped shape of the first depression. In this way, the lock case nestles in the first depression and has the horizontal surface pressing against the support surface of the first depression. Its screw connection surfaces press against the stop surfaces, which are implemented out of the front wall. The screw connection surfaces preferably protrude orthogonally in different directions from the horizontal surface.

In contrast to prior art lock cases that have a double L-shape, the lock case contemplated herein is configured as a deep-drawn part having a double L-shaped basic contour. It has a horizontal surface arranged approximately in the middle, which connects the front screw connection surface and the rear screw connection surface. Through this horizontal surface, which is arranged approximately in the middle and is oriented horizontally in the installed state, the intrinsic stiffness of the lock case is significantly increased in comparison to known lock cases. In this way, it is possible to compensate for a profile-related weakening of the U-shaped lock crossbeam, in that the lock case is preferably connected to the lock crossbeam by four screw connections.

In another embodiment, a catch hook, a rotary latch, and an unlocking device are fastened on the lock case. The catch hook is used for secondary latching of the hood lock. The rotary latch cooperates with a lock bow of the engine hood in that it encompasses it. The unlocking device allows the lock bow to be released and the engine hood to be opened.

The unlocking device is preferably connected to a Bowden cable, which is guided on the side of the lock crossbeam which faces away from the front wall. The unlocking device of the hood lock can thus extend through the above-described rectangular through holes and cooperate with the Bowden cable. The unlocking device of the hood lock is implemented as configured so that it can be guided through the rectangular through holes during the installation of the hood lock on the lock crossbeam. The Bowden cable for actuating the unlocking device can be installed in the lock crossbeam from the rear side thereof.

In a further embodiment, a second depression is implemented in the front wall, which extends orthogonally to the front wall a lesser distance than the first depression. A catch hook can be at least partially accommodated in the second depression, so that it nearly does not protrude in the travel direction. The front overhang can thus be reduced in a particularly favorable manner. The catch hook, which is used for the secondary latching, can be arranged approximately aligned with the non-embossed front wall through the second depression or indentation. Through this measure, the hood lock is arranged in the longitudinal extension of the lock crossbeam. The arrangement of hood lock and lock crossbeam therefore has a minimal dimension in the vehicle longitudinal direction.

The second depression can be implemented as a second indentation, which is implemented in the form of a well in the front stop surface. In this regard, a metal lock crossbeam, which is preferably configured as a sheet-metal part, can be provided with the second depression by an embossing or shaping technology.

In an embodiment, the lock crossbeam is designed as U-shaped in cross-section, the U-shape being formed by the front wall and two side walls protruding therefrom. In this regard, the lock crossbeam has a high twisting stiffness. Furthermore, reinforcing elements such as plastic ribs can be arranged in the interior of the lock crossbeam. The U-shape allows deep indentations to be implemented in the lock crossbeam.

In another embodiment, the lock crossbeam comprises a metal part, on which plastic components are at least partially extrusion coated. The lock crossbeam has a U-shaped basic contour, which is open in the vehicle longitudinal direction, and is preferably characterized by a hybrid construction. In such a construction, a sheet-metal structure is extrusion coated using plastic to ensure a minimal part weight.

According to a further embodiment, plastic ribs are provided on the side of the lock crossbeam which faces away from the front wall. The plastic ribs increase the torsional stiffness and the twisting stiffness of the lock crossbeam. Weld nuts can be provided on the side of the lock crossbeam which faces away from the front wall. Screws can be accommodated in the weld nuts, which are guided through the through holes in order to screw the lock case together with the lock crossbeam.

BRIEF DESCRIPTION OF THE DRAWINGS

The various embodiments will hereinafter be described in conjunction with the following drawing figures, wherein like numerals denote like elements, and wherein.

engaged with the rotary latch (shown), and the rotary latch partially accommodated in the first indentation (shown).

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
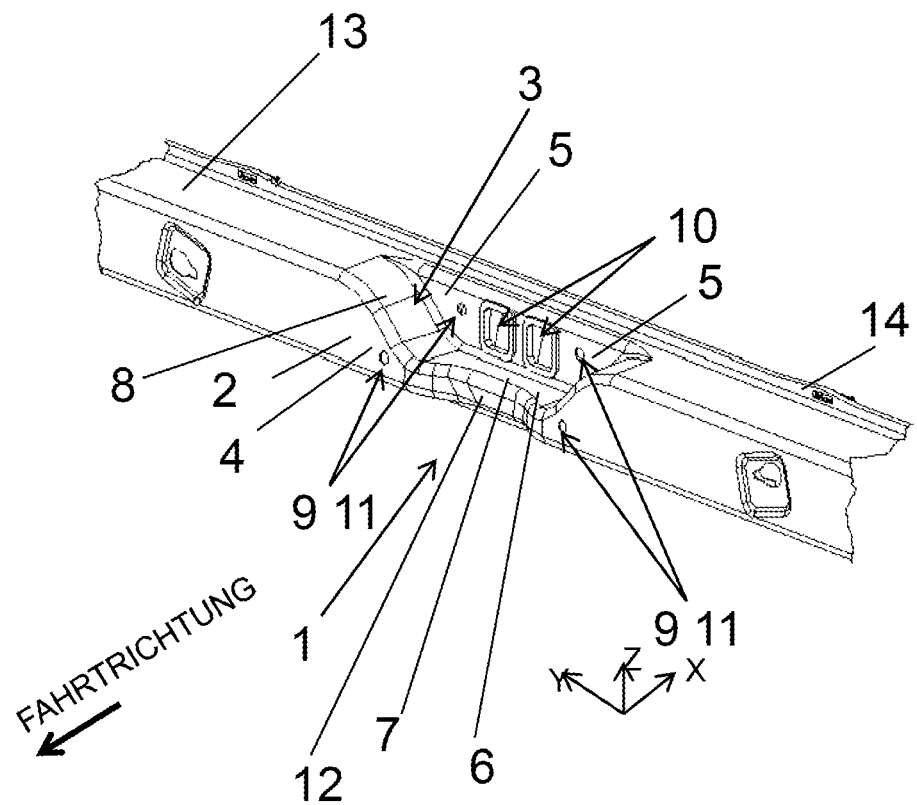
FIG. 1 is a perspective front view of a lock crossbeam for use in a vehicle body of a motor vehicle, in accordance with an exemplary embodiment.

FIG. 1 is a perspective front view of a lock crossbeam 1, which is usable in a vehicle body (not shown) of a motor vehicle. The lock crossbeam 1 has a front wall 2, whose front surface is oriented in the installed state in the forward travel direction of a motor vehicle. The front wall 2 is oriented perpendicularly in the installed state. This orientation is shown similarly in FIG. 5.

A first depression 3, which is oriented in the forward travel direction of a motor vehicle in the installed state, is implemented in the front wall 2. The first depression 3 is implemented as stepped, a front stop surface 4 being provided, which is spaced apart from a rear stop surface 5 in the travel direction. The front stop surface 4 and the rear stop surface 5 are oriented parallel to one another and are implemented from the front wall 2 by an indentation.

The first depression 3 is implemented as a first indentation in the front wall 2.

The first depression 3 has a support surface 6 extending orthogonally to the front wall 2. The support surface 6 is implemented as curved. It has two ramps 8 adjoining a horizontally oriented central part 7 on both sides. The ramps 8 extend upward away in a curve from the central part 7.

Two circular through holes 9 are implemented in the front stop surface 4. The circular through holes 9 are arranged on both sides of the first depression 3.

Two rectangular through holes 10 are implemented in the rear stop surface 5 inside the first depression 3.

Two further circular through holes 11 are implemented in the rear stop surface 5 inside the first depression 3. The further circular through holes 11 are arranged on both sides of the two rectangular through holes 10.

A second depression 12 is implemented in the front wall 2, which extends a lesser distance in the travel direction orthogonally to the front wall 2 than the first depression 3.

The second depression 12 is implemented as a second indentation, which is implemented in the form of a well in the front stop surface 4.

The lock crossbeam 1 is designed as U-shaped in cross-section, the U-shape being formed by the front wall 2 and two side walls 13 protruding therefrom.

The lock crossbeam 1 consists of a metal part, on which plastic components 14 are at least partially extrusion coated. The plastic components 14 extend in a strip shape along the side walls 13.

Figure 2:
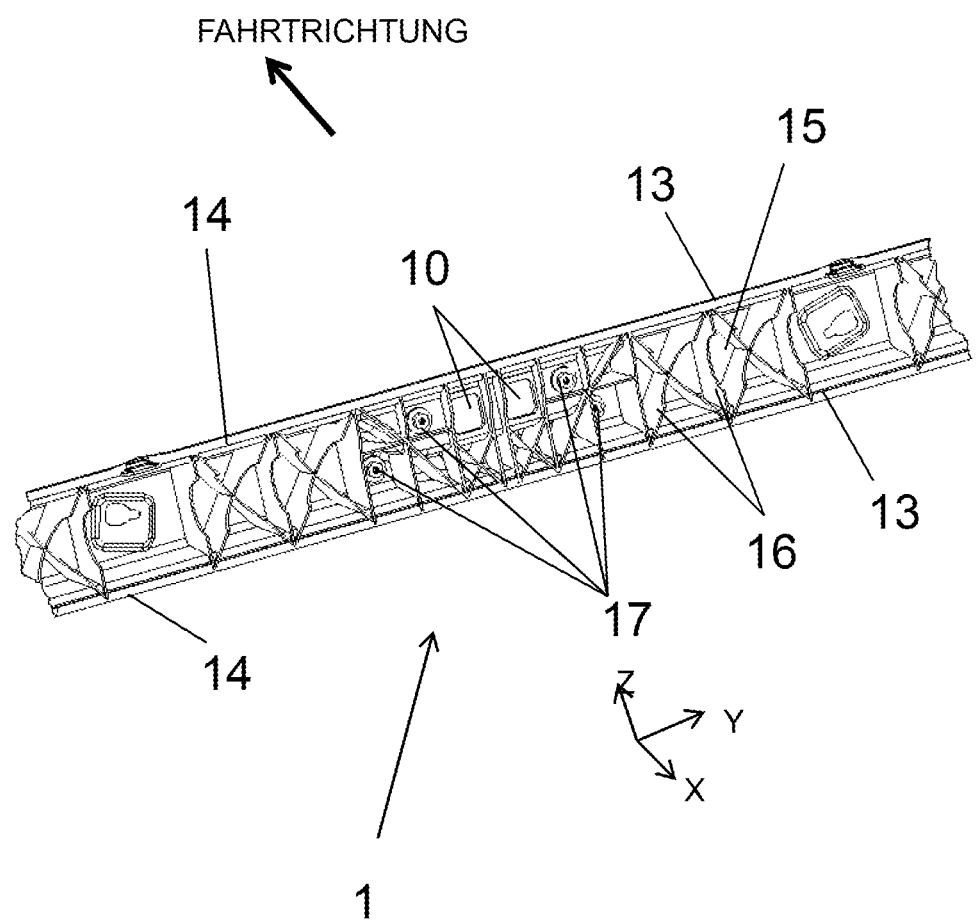
FIG. 2 is a perspective rear view of the lock crossbeam according to FIG. 1, plastic ribs being shown.

FIG. 2 shows the lock crossbeam 1 according to FIG. 1 from a perspective rear view.

The lock crossbeam 1 is designed as U-shaped in cross-section, the U-shape being formed by the front wall 2 and two side walls 13 protruding therefrom.

The lock crossbeam 1 consists of a metal part, on which plastic components 14 are at least partially extrusion coated. The plastic components 14 extend in a strip shape along the side walls 13.

Plastic ribs 16 are provided on the side 15 of the lock crossbeam 2 which faces away from the front wall 2. The plastic ribs 16 are arranged extending intersecting or linearly between the side walls 13.

Weld nuts 17 are provided on the side 15 of the lock crossbeam 2 which faces away from the front wall 2. Screws are accommodated in the weld nuts 17.

Figure 3:
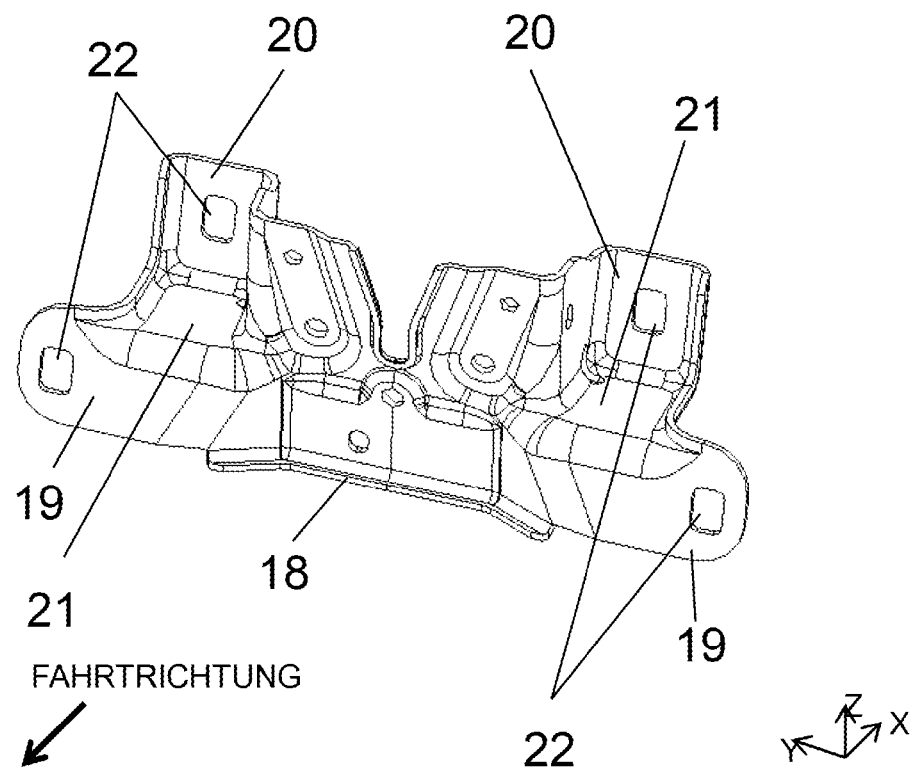
FIG. 3 is a perspective front view of a lock case of a hood lock that is fastenable on a lock crossbeam according to FIGS. 1 and 2.

FIG. 3 shows a perspective view of a lock case 18. The lock case 18 has a front screw connection surface 19, which is to press against the front stop surface 4, and a rear screw connection surface 20, which is to press against the rear stop surface 5.

The two screw connection surfaces 19, 20 are connected to one another by a horizontal surface 21 and protrude in different directions therefrom. In this way, the lock case 18 has a stepped double L-shape in cross-section.

Holes 22, which are to essentially align with the through holes in 9, 11 in the lock crossbeam 1, in order to screw the lock case 18 together with the lock crossbeam 1, are implemented in the two screw connection surfaces 19, 20.

The travel direction of a motor vehicle is shown in each of FIGS. 1 to 3 by an arrow.

Figure 4:
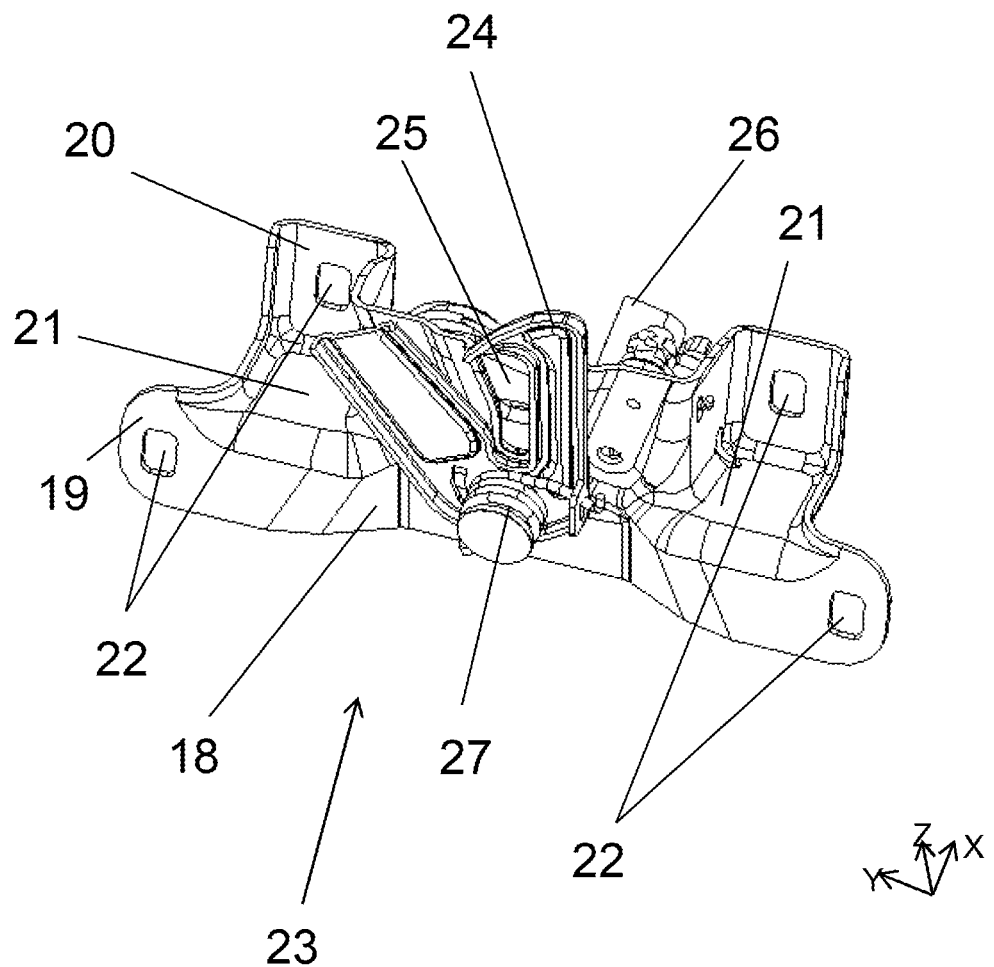
FIG. 4 is a perspective front view of a hood lock having a lock case according to FIG. 3, a catch hook, a rotary latch, and an unlocking device.

FIG. 4 is a perspective front view of a hood lock 23 having a lock case 18 according to FIG. 3. A catch hook 24, a rotary latch 25, and an unlocking device 26 are fastened on the lock case 18. Furthermore, a restoring spring 27 is provided.

Figure 5:
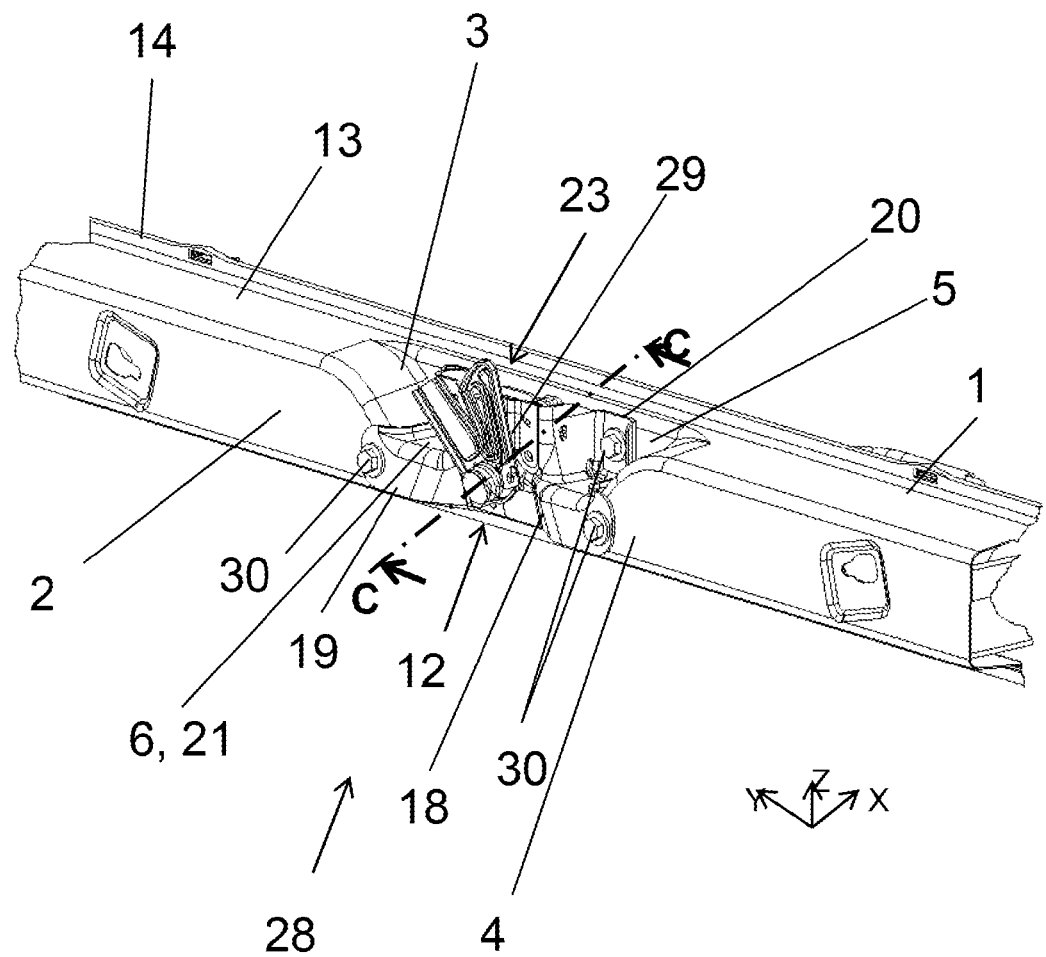
FIG. 5 is a perspective front view of an arrangement, which comprises the lock crossbeam according to FIGS. 1 and 2 and the hood lock according to FIG. 4.

FIG. 5 shows a perspective view from the front of an arrangement 28 for a vehicle body (not shown) of a motor vehicle in the installed state. The arrangement 28 comprises a lock crossbeam 1 and a hood lock 23 having a lock case 18. The lock crossbeam 1 has a front wall 2. The hood lock 23 is fastened on the front wall 2 of the lock crossbeam and a first depression 3 is implemented in the front wall 2, in which the hood lock 23 is at least partially accommodated.

The first depression 3 is implemented as stepped, a front stop surface 4 being provided, which is spaced apart from a rear stop surface 5. The lock case 18 presses against the front stop surface 4 and the rear stop surface 5, while a middle part 29 of the lock case 18 is accommodated in the first depression 3. The lock case 18 is screwed onto the lock crossbeam 1 using screws 30.

The lock crossbeam 1 has a front wall 2, whose front surface is oriented in the installed state in the forward travel direction of a motor vehicle. The front wall 2 is oriented perpendicularly in the installed state. This alignment is shown similarly in FIG. 1.

The first depression 3 is implemented as a first indentation in the front wall 2, which is oriented in the installed state in the forward travel direction of a motor vehicle.

The first depression 3 has a support surface 6, which extends orthogonally to the front wall 2, for the middle part 29 of the lock case 18.

Two circular through holes 9 are implemented in the front stop surface 4, through which the screws 30 extend, which are screwed together with the above-described weld nuts 17.

Two rectangular through holes 10 are implemented in the rear stop surface 5 inside the first depression 3.

Two further circular through holes 11, through which the screws 30 extend, which are screwed together with the above-described weld nut 17, are implemented in the rear stop surface 5 inside the first depression 3.

The lock case 18 has a front screw connection surface 19, which presses against the front stop surface 4, and a rear screw connection surface 20, which presses against the rear stop surface 5. The two screw connection surfaces 19, 20 are connected to one another by a horizontal surface 21.

A catch hook 24, a rotary latch 25, and an unlocking device 26 are fastened on the lock case 18.

A second depression 12 is implemented in the front wall 2, which extends a lesser distance orthogonally to the front wall 2 than the first depression 3. The catch hook 24 is accommodated in the second depression 12.

The second depression 12 is implemented as a second indentation for this purpose, which is implemented in the form of a well in the front stop surface 4.

Figure 6:
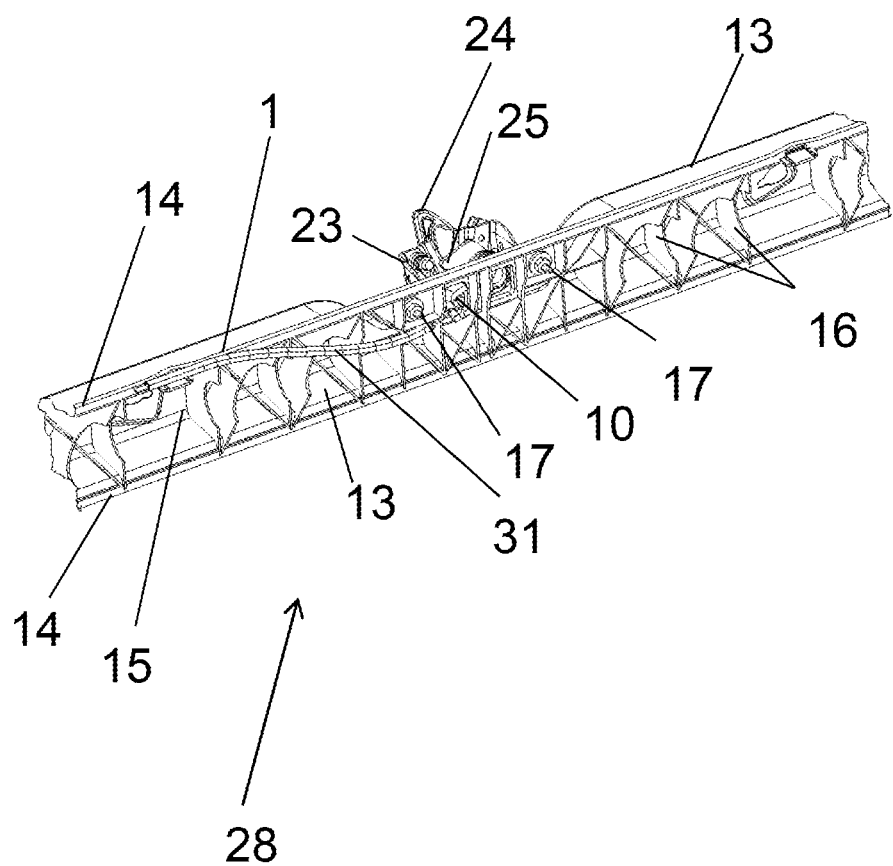
FIG. 6 is a perspective rear view of an arrangement that comprises the lock crossbeam according to FIGS. 1 and 2 and the hood lock according to FIG. 4, the plastic ribs being shown.

FIG. 6 shows a perspective view of the arrangement 28 according to FIG. 5 from the rear. The lock crossbeam 1 is configured as U-shaped in cross-section, the U-shape being formed by the front wall 2 and two side walls 13 protruding therefrom.

The lock crossbeam 1 consists of a metal part, on which plastic components 14 are at least partially extrusion coated. Plastic ribs 16 are provided on the side 15 of the lock crossbeam 1 which faces away from the front wall 2. Weld nuts 17 are provided on the side 15 of the lock crossbeam 1 which faces away from the front wall 2.

The unlocking device 26 is connected to a Bowden cable 31, which is guided on the side 15 of the lock crossbeam 1 which faces away from the front wall 2. The unlocking device 26 engages through a rectangular through hole 10.

Figure 7:
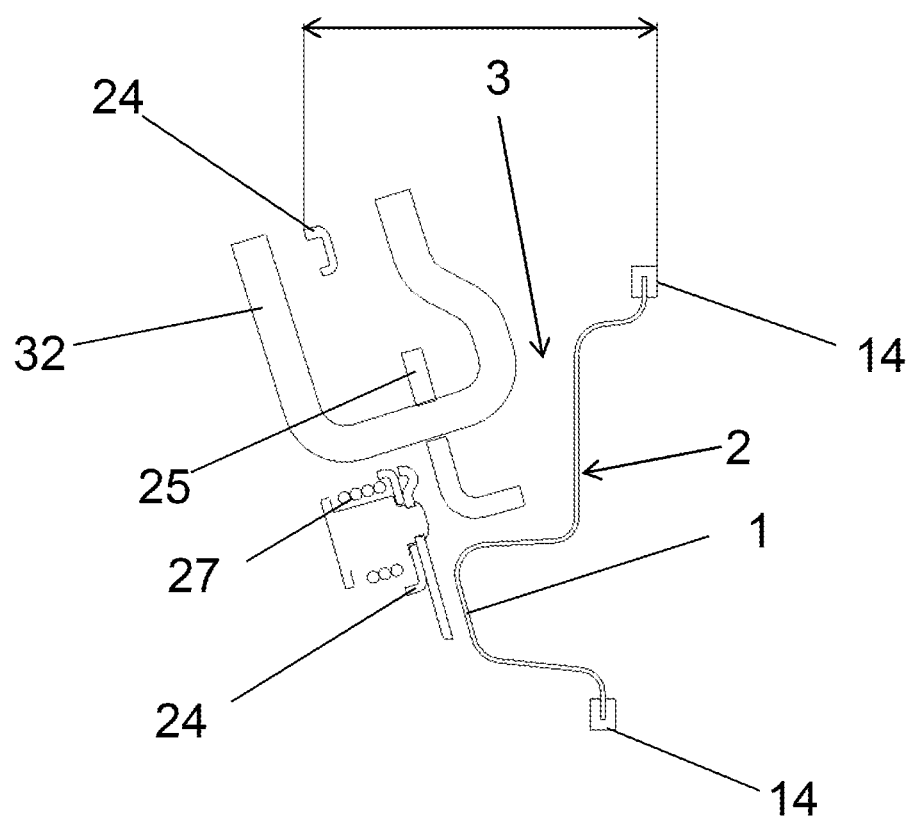
FIG. 7 is a cross-sectional view taken along line C-C of FIG. 5 illustrating a lock bow of an engine hood (not shown)

FIG. 7 shows a cross-sectional view of the arrangement 28 along section line C-C according to FIG. 5. In an embodiment, the double arrow illustrates a distance of 68 mm. In this way, it is shown that an installation space reduced by 20 mm is required for the arrangement 28 in relation to the arrangements of the prior art.

The cross-sectional view shows how the rotary latch 25 encompasses a lock bow 32 of an engine hood (not shown). The rotary latch 25 protrudes jointly with the lock bow 32 into the first depression 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An arrangement for a vehicle body of a motor vehicle, the arrangement comprising:
    a lock crossbeam having a front wall; and
    a hood lock fastened on the front wall of the lock crossbeam and having a lock case, the lock case including a front screw connection surface coupled to a rear screw connection surface by a horizontal surface such that the front screw connection surface is offset from the rear screw connection surface,
    wherein the front wall has a first depression in which the hood lock is at least partially accommodated, wherein the first depression is stepped, wherein the front wall has a front stop surface that is spaced apart from a rear stop surface in a travel direction of the motor vehicle, and wherein the lock case presses against the front stop surface and the rear stop surface while a middle part of the lock case is accommodated in the first depression.

2. The arrangement according to claim 1, wherein the first depression is configured as a first indentation in the front wall.

3. The arrangement according to claim 1, wherein the first depression has a support surface extending orthogonally to the front wall for the middle part of the lock case.

4. The arrangement according to claim 1, wherein the front stop surface has two circular through holes.

5. The arrangement according to claim 1, wherein the rear stop surface has two rectangular through holes inside the first depression.

6. The arrangement according to claim 1, wherein the rear stop surface has two further circular through holes inside the first depression.

7. The arrangement according to claim 1, wherein the front screw connection surface presses against the front stop surface, and the rear screw connection surface presses against the rear stop surface.

8. The arrangement according to claim 1, wherein a catch hook, a rotary latch, and an unlocking device are fastened on the lock case.

9. The arrangement according to claim 8, wherein the unlocking device is connected to a Bowden cable, which is guided on a side of the lock crossbeam which faces away from the front wall.

10. The arrangement according to claim 1, wherein the front wall has a second depression, which extends a lesser distance orthogonally to the front wall than the first depression.

11. The arrangement according to claim 10, wherein the second depression is implemented as a second indentation, which is implemented in the form of a well in the front stop surface.

12. The arrangement according to claim 1, wherein the lock crossbeam is U-shaped in cross-section, the U-shape being formed by the front wall and two side walls protruding therefrom.

13. The arrangement according to claim 12, wherein plastic ribs are disposed on a side of the lock crossbeam that faces away from the front wall.

14. The arrangement according claim 1, wherein the lock crossbeam comprises a metal part on which plastic components are at least partially extrusion coated.

15. The arrangement according to claim 1, wherein weld nuts are provided on a side of the lock crossbeam-that faces away from the front wall.

* * * * *